Patented July 13, 1943

2,323,929

UNITED STATES PATENT OFFICE 2,323,929

STABILIZATION OF SOILS

Abraham B. Miller, Newark, Del., assignor to Hercules Powder Company, Wilmington, Del., a corporation of Delaware No Drawing. Application October 18, 1940, Serial No. 361,727

14 Claims. (Cl. 106—238)

This invention relates to the stabilization of soils, and more particularly to the stabilization of road soils and the like by the addition of a small amount of a substantially petroleum-hydrocarbon insoluble pine wood resin.

Soil stabilization is the treatment of soils to correct the natural deficiencies thereof and to render them more suitable for use as road-building materials or the like. For example, in the case of some soils, poor load-bearing qualities may be improved. In the case of other soils which have poor moisture resistance, they may be stabilized to prevent rutting, frost heaving, and other phenomena associated with weakening by water.

It has been proposed to prepare stabilized soils for use in road building by blending soils of various particle sizes and physical and chemical properties. For example, a soil which is hard and resists the abrasive and impact action of trafic may be blended with a soil which may provide for interlocking of the soil grains and thereby effect an increase in shear strength. Clay-like materials might be added to absorb water and maintain stability in dry weather. Silt might also be desired to act as a filler and to provide a capillary bond in the presence of water when the clay becomes weak by losing cohesion in wet weather. While such stabilized soil blends have met with some measure of success, they are highly disadvantageous in that their preparation requires grading and blending of an enormous volume of materials and may often require transporting the different soil ingredients from widely separated localities.

It has also been proposed to stabilize soils through the addition of deliquescent materials, such as calcium chloride, to prevent dusting and to prevent the roads from becoming muddy in wet weather. Also, water-soluble binders, such as sulfite liquor concentrate and distillery wastes, have been proposed. The use of such materials, however, is disadvantageous in that at best they provide only temporary stabilization.

I have now found that low-grade soils may be advantageously stabilized by mixing with them a small amount of an aqueous slurry or suspension of a substantially petroleum-hydrocarbon insoluble pine wood resin. The soils may or may not be blended first with aggregate or fines to increase their strength and serviceability, and, if desired, the aqueous resin suspension may be used in combination with other stabilizing agents, e. g. calcium chloride. Soils stabilized according to the method of the invention are readily prepared, requiring a minimum amount of handling and transportation of materials, and remain stabilized over long periods of time. They are suitable for use in the construction of dams, levees, embankments, etc.; in packing underground pipe lines, conduits, foundations, and the like; and in surfacing roads, race-tracks, tennis courts, playing fields, etc.

The material herein defined by the term "substantially petroleum-hydrocarbon insoluble pine wood resin" is the resinous material which may be prepared from pine wood preferably from stump pine wood, in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum-hydrocarbon such as, for example, gasoline, dissolves and removes the rosin. After separation of the rosin, high in abietic acid, a resinous residue remains which is low in abietic acid. Alternatively, the residue of the initial coal tar hydrocarbon extract may be dissolved in gasoline and treated with furfural, and the two layers which form separated. The resinous residue is found dissolved in the furfural from which it may be obtained by evaporation of the furfural. This resinous residue, used in the composition of the present invention, is characterized by a dark red-brown color, cherry red in solution, and by substantial insolubility in petroleum hydrocarbons; but it will vary somewhat in its specific characteristics such as acid number, melting point, exact petroleum ether solubility, and content of naphtha and toluol insoluble material, depending upon the details of the extraction processes utilized. The resinous residue may be defoamed by steaming or heat treating to remove volatile substances.

Another method of producing this resin comprises treating the benzol extracted wood rosin with a mixture of gasoline and furfural which effectively dissolves the rosin in the gasoline and the resin in the furfural. The mixture is then permitted to stand and settle until two layers are formed which are separated. The furfural layer is then run through a still to remove the furfural, and the resin is recovered.

This resin will meet or nearly meet the following specifications; namely, substantial insolubility in petroleum hydrocarbons, substantially complete solubility in alcohol, a methoxy content from about 3% to about 7.5% (usually from about 4% to about 6%), an acid number in the range from about 80 to about 110, and a drop melting point in the range from about 95° C. to about 125° C.

The soils which may be stabilized according to the invention include silts, clays, and mixtures thereof, or mixtures of silts and/or clays with cinders, pebbles, aggregates, or any other materials which by mechanical or other treatment can be made suitable for use for the purposes mentioned above.

As hereinbefore mentioned, the process of the invention comprises admixing with the soil to be stabilized a dilute, e. g. 1–15 per cent by weight, aqueous suspension or slurry of the substantially petroleum-hydrocarbon insoluble pine wood resin. Such suspensions are formed by mixing the resin, preferably in finely divided form, with water to which has been added a small amount, e. g. from about 1.0 to about 6.0 per cent by weight of the resin, of a dispersing agent adapted to maintain the resin in aqueous suspension. Suitable dispersing agents are dispersive clays, such as bentonite, or, in some cases, finely divided local soil; or organic materials, such as saponified rosin, or ammonium caseinate. A particularly convenient and preferred dispersing agent may be formed in situ simply by adding to the water a small amount of an alkaline agent, such as sodium hydroxide, potassium hydroxide, trisodium phosphate, sodium silicate, etc. Such alkaline agents saponify a minor proportion of the resin to form compounds which are excellent dispersing agents for the resin. The partially saponified resin need not of course be formed in situ, but may be prepared separately, mixed with the resin, and the mixture suspended in water.

In employing an alkali, for example, sodium hydroxide, in preparing aqueous substantially petroleum-hydrocarbon pine wood resin suspensions for use in stabilizing soils according to the invention, I prefer to proceed by dissolving from about 0.1 to about 10.0 parts by weight of the alkali in 1000 parts of water and thereafter adding with stirring from about 10 to about 150 parts by weight of the finely divided resin. If desired, a small amount of an anti-foaming agent, such as kerosene, may be added to reduce foaming during the mixing operation.

The addition of the resin suspension to the soil may be carried out in a number of ways, the most convenient of which depends upon the particular type of soil and the conditions under which the operation is carried out. For example, the soil may first be graded or blended in the customary manner and the resin suspension mixed therewith prior to use. In stabilizing roads already constructed, the surface layer of the road may be harrowed or plowed and the resin suspension mixed in by scarifying, blading, or harrowing after which the road may be rolled and the surface compacted. Roads which are subjected to heavy traffic should then be given a wearing course of asphalt or aggregate. In some instances, it may be sufficient merely to sprinkle the suspension over the road.

The proportion of resin required to secure the desired stabilization depends primarily upon the nature of the soil, some soils requiring more of the stabilizing agent than others to obtain the same degree of stabilization. Ordinarily, however, the use of between about 0.2 and about 10 per cent of the resin, based on the weight of soil, will be found to produce good results.

The following examples illustrate several ways in which the principle of the invention has been demonstrated and applied, but are not to be construed as limiting the same. In said examples, the "resin" referred to is in all cases the substantially petroleum-hydrocarbon insoluble pine wood resin hereinbefore defined.

EXAMPLE I

An aqueous substantially petroleum-hydrocarbon pine wood resin suspension was prepared by thoroughly mixing 1300 pounds of the resin with 1000 gallons of water in which had been dissolved 22 pounds of sodium hydroxide, after which one pint of kerosene was added to reduce foaming. This suspension was distributed from sprinkler wagons over a road composed of a plastic soil, which varied from Public Roads Administration Class A–2 soil to Clas A–4 soil, at a rate of ½ gallon per square yard until a total of 3.6 gallons per square yard had been applied. Additional water was added and the road surface was compacted with a sheep's-foot roller and a motor patrol grader. The road surface so treated dried within 4 or 5 hours after very heavy rains and showed no tendency to cause skidding when wet.

EXAMPLE II

The table below presents data obtained by subjecting samples of soils stabilized according to the invention to the standard slaking test. In each experiment the soil was molded into a tensile-type briquette, which, with the exception of the neck portion thereof, was coated with paraffin. One end of each briquette, including the neck, was then immersed in water, and the slaking time, i. e., the time required for disintegration of the briquette, was determined.

Table

| Exp't No. | Composition of stabilized soil | | Mixing characteristics | Slaking time |
|---|---|---|---|---|
| | Soil | Stabilizing agent | | |
| 1 | 70% sand, 30% clay-like material | None (control) | Wets rapidly | 1.7 min. |
| 2 | ----do---- | 0.5% resin in 7 parts N/20 NaOH | ----do---- | 74 min. |
| 3 | ----do---- | 1.0% resin in 7 parts N/20 NaOH | ----do---- | 308 min. |
| 4 | 60% clay-like material, 40% sand | None (control) | ----do---- | 30 min. |
| 5 | ----do---- | 0.5% resin in 7 parts N/20 NaOH | ----do---- | 150 min. |
| 6 | ----do---- | 2.0% resin in 7 parts N/20 NaOH | ----do---- | 960 min. |
| 7 | Silt-like material | None (control) | ----do---- | 19 min. |
| 8 | ----do---- | 1.0% resin in 7 parts N/20 NaOH | ----do---- | 440 min. |
| 9 | ----do---- | 3.0% resin in 7 parts N/20 NaOH | ----do---- | Over 1 day. |
| 10 | ----do---- | 3.0% resin (not in suspension) | Wets slowly | 17 hrs. |
| 11 | ----do---- | None (control) | Wets rapidly | 32 min. |
| 12 | ----do---- | 0.25% resin in 26 parts N/20 NaOH | ----do---- | 185 min. |
| 13 | ----do---- | 2.0% resin in 7 parts N/20 NaOH | ----do---- | 1 day. |
| 14 | ----do---- | None (control) | ----do---- | 30 min. |
| 15 | ----do---- | 0.7% resin in 26 parts of 5% aqueous bentonite suspension. | Wets slowly at first. | 150 min. |
| 16 | ----do---- | 0.7% resin in 26 parts aqueous ammonium caseinate. | Wets rapidly | 870 min. |
| 17 | ----do---- | 0.7% resin in 26 parts of 10% suspension of bentonite in N/20 NaOH. | ----do---- | 270 min. |

The above data indicate that the stabilizing agent can be readily mixed with the soil and dispersed throughout the soil particle aggregates. The resistance to slaking indicates that the stabilizing agent greatly improves the erosion resistance of the soil. It also increases the compressive strength of the soil and imparts improved all-around wearing characteristics to constructions formed from such stabilized soils. A comparison of Experiments 9 and 10 in the above table indicates the improved results obtained by employing the resin in aqueous suspension rather than in the dry state.

By varying the proportion of the resin as well as the character of the soil itself, a wide variety of soil compositions having pre-determined characteristics may be prepared.

Other modes of applying the principle of my invention may be employed instead of those explained, change being made as regards the methods or compositions herein disclosed, provided the method or the ingredients stated by any of the following claims, or the equivalent of such stated methods or ingredients, be employed.

This application is a continuation-in-part of my copending application, Serial No. 318,201, filed February 9, 1940.

What I claim and desire to protect by Letters Patent is:

1. The method of stabilizing soil which comprises admixing therewith an aqueous suspension of a substantially petroleum-hydrocarbon insoluble pine wood resin, said suspension containing a dispersing agent for the said resin.

2. The method of stabilizing soil which comprises admixing therewith an aqueous suspension of a substantially petroleum-hydrocarbon insoluble pine wood resin, said suspension containing a small amount of saponified substantially petroleum-hydrocarbon insoluble pine wood resin.

3. The method of stabilizing soil which comprises forming an aqueous suspension of a substantially petroleum-hydrocarbon insolube pine wood resin by mixing said resin with a small amount of dilute aqueous solution of an alkali to saponify a minor proportion of the resin, and thereafter admixing said suspension with the soil.

4. The method of stabilizing soil which comprises forming an aqueous suspension of a substantially petroleum-hydrocarbon insoluble pine wood resin by mixing said resin with a small amount of dilute aqueous solution of sodium hydroxide to saponify a minor proportion of the resin, and thereafter admixing said suspension with the soil.

5. A method of stabilizing soil which comprises admixing therewith from about 0.2 to about 10 per cent by weight of a substantially petroleum-hydrocarbon insoluble pine wood resin in the form of a dilute aqueous suspension formed by mixing said resin with water having dissolved therein from about 0.1 to about 6 per cent of sodium hydroxide based on the weight of the resin.

6. A stabilized soil prepared by the method defined in claim 1.

7. A stabilized soil prepared by the method defined in claim 2.

8. A stabilized soil prepared by the method defined in claim 3.

9. A stabilized soil prepared by the method defined in claim 4.

10. A stabilized soil prepared by the method defined in claim 5.

11. A stabilized soil having dispersed therein a substantially petroleum-hydrocarbon insoluble pine wood resin and a small amount of a saponified substantially petroleum-hydrocarbon insoluble pine wood resin.

12. A stabilized soil having dispersed therein a substantially petroleum-hydrocarbon insoluble pine wood resin and a dispersing agent for said resin.

13. A stabilized soil having dispersed therein a substantially petroleum-hydrocarbon insoluble pine wood resin and bentonite as a dispersing agent for said resin.

14. A stabilized soil having dispersed therein a substantially petroleum-hydrocarbon insoluble pine wood resin and ammonium caseinate as a dispersing agent for said resin.

ABRAHAM B. MILLER.